United States Patent
Hamatani et al.

(10) Patent No.: US 9,665,069 B2
(45) Date of Patent: May 30, 2017

(54) ELECTRIC GENERATOR DEVICE, TIMEPIECE MOVEMENT, AND TIMEPIECE

(71) Applicant: ASAHI GLASS COMPANY, LIMITED, Chiyoda-ku (JP)

(72) Inventors: Yoshiki Hamatani, Chiyoda-ku (JP); Masahiro Nakajima, Chiba (JP); Takashi Niwa, Chiba (JP); Miei Konishi, Chiba (JP); Toru Ozaki, Chiba (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/049,430

(22) Filed: Feb. 22, 2016

(65) Prior Publication Data

US 2016/0170377 A1    Jun. 16, 2016

Related U.S. Application Data

(63) Continuation of application No. PCT/JP2014/070383, filed on Aug. 1, 2014.

(30) Foreign Application Priority Data

Aug. 27, 2013 (JP) .................................. 2013-175911

(51) Int. Cl.
*G04C 10/00* (2006.01)
*F03G 1/08* (2006.01)
(Continued)

(52) U.S. Cl.
CPC ............... *G04C 10/00* (2013.01); *F03G 1/08* (2013.01); *F03G 1/10* (2013.01); *G04C 3/102* (2013.01); *H02K 7/1892* (2013.01)

(58) Field of Classification Search
CPC ...... H02K 7/18; H02K 7/1853; H02K 7/1892; G04C 10/00; G04C 3/102; G04G 19/00;
(Continued)

(56) References Cited

U.S. PATENT DOCUMENTS 3,937,001 A * 2/1976 Berney ................. G04C 10/00
  318/147
4,287,428 A * 9/1981 Smith ...................... H02J 7/14
  185/11

(Continued)

FOREIGN PATENT DOCUMENTS

JP         4229970       2/2009
JP     2012-206630      10/2012
(Continued)

OTHER PUBLICATIONS

Machine translation of JP2013059149, retrieved from the internet Sep. 23, 2016.*

(Continued)

*Primary Examiner* — Vit W Miska
(74) *Attorney, Agent, or Firm* — Oblon, McClelland, Maier & Neustadt, L.L.P.

(57) ABSTRACT

An electric generator device includes a swinging part, a storage part, a vibration energy generating part, and an electric generator part. The swinging part swings in position due to external swing. The storage part stores a swing power of the swinging part. The vibration energy generating part generates, by the power stored at the storage part, vibration energy having its amplitude and frequency adjusted. The electric generator part converts the vibration energy generated at the vibration energy generating part to electric power. The vibration energy generating part comprises a pendulum to be in contact with a rotary part which is rotated by the (Continued)

power stored at the storage part, thereby to adjust the rotational speed of the rotary part.

20 Claims, 4 Drawing Sheets

(51) Int. Cl.
    *H02K 7/18*     (2006.01)
    *G04C 3/10*     (2006.01)
    *F03G 1/10*     (2006.01)

(58) Field of Classification Search
    CPC .... H02N 1/06; H02N 1/08; F03G 1/08; F03G 1/10
    See application file for complete search history.

(56) References Cited

U.S. PATENT DOCUMENTS

| | | | | |
|---|---|---|---|---|
| 4,799,003 | A * | 1/1989 | Tu | G04C 10/00 290/1 E |
| 6,124,649 | A * | 9/2000 | Schafroth | G04C 10/00 310/156.37 |
| 6,154,422 | A * | 11/2000 | Shinkawa | G04C 10/00 320/166 |
| 6,563,766 | B1 * | 5/2003 | Nakamiya | G04C 10/04 320/162 |
| 2002/0060954 | A1 * | 5/2002 | Schafroth | G04C 3/008 368/204 |
| 2004/0004909 | A1 * | 1/2004 | Fujimori | G04C 10/00 368/204 |
| 2004/0140790 | A1 * | 7/2004 | Matsuzawa | G04C 10/00 322/44 |
| 2007/0024233 | A1 * | 2/2007 | Ekchian | H02K 7/1861 320/101 |
| 2007/0145750 | A1 * | 6/2007 | Terzian | F03G 3/00 290/50 |

FOREIGN PATENT DOCUMENTS

| | | |
|---|---|---|
| JP | 2013-59149 | 3/2013 |
| JP | 2013-135544 | 7/2013 |

OTHER PUBLICATIONS

Machine translation of JP2012206630, retrieved from the internet Sep. 23, 2016.*

International Search Report issued Oct. 21, 2014 in PCT/JP2014/070383 filed Aug. 1, 2014.

* cited by examiner

ELECTRIC GENERATOR DEVICE, TIMEPIECE MOVEMENT, AND TIMEPIECE

TECHNICAL FIELD

The present invention relates to an electric generator device, and a timepiece movement and timepiece provided with the electric generator device.

BACKGROUND ART

An electric generator device utilizing electrostatic induction by electret materials has been proposed.

Patent Document 1 proposes an electric generator device wherein an immovable substrate having a plurality of electret electrodes on its surface, and a movable substrate having a plurality of movable electrodes on its surface, are disposed with a space between them.

The movable electrodes and the movable substrate are connected, via an elastic member such as a spring power driver, to a fixed structure provided on the immovable substrate. The movable substrate is constructed to be moved when an external vibration is applied to the electric generator device. It is said to be desirable to utilize environmental vibration, as the external vibration to excite the electric generator device, considering the improvement of power generation efficiency.

The movable substrate is moved by the input of external vibration. Thus, the overlapping area of the electret electrodes and the movable electrodes increases or decreases from the initial area. By this change in the overlapping area, a change in electric charge occurs in the movable electrodes (collecting electrodes). The electric generator device converts an alternating current generated by the change in electric charge, for example, via a converter circuit such as a half-wave rectifier circuit, to a direct current and takes it out as an electric energy, thus accomplishing power generation. In general, the conversion efficiency for converting an alternating current to a direct current by a converter circuit, is known to be better when the frequency and period of the alternating current are constant, than when the frequency and period of the alternating current are irregular.

PRIOR ART DOCUMENT

Patent Document

Patent Document 1: Japanese Patent No. 4,229,970

DISCLOSURE OF INVENTION

Technical Problem

However, in the conventional technique, since the frequency and amplitude of environmental vibration are not constant, the frequency and amplitude of the alternating current generated by a change of the charge of collecting electrodes also become irregular. Therefore, there is a limit in improvement of the conversion efficiency at the time of converting an alternating current to a direct current, i.e. in improving the power generation efficiency of the electric generator device.

The present invention has been made in view of the above circumstances, and is provide an electric generator device excellent in power generation efficiency, and a timepiece movement and timepiece provided with such an electric generator device.

Solution to Problem

The gist of the present invention is represented by the following [1] to [11].

[1] An electric generator device comprising
  a swinging part which swings in position due to external swing,
  a storage part to store the swing power of the swinging part,
  a vibration energy generating part to generate, by the power stored at the storage part, vibration energy having its amplitude and frequency adjusted, and
  an electric generator part to convert the vibration energy generated at the vibration energy generating part to electric power.

[2] The electric generator device according to the above [1], wherein the vibration energy generating part has a pendulum to be in contact with a rotary part which is rotated by the power stored at the storage part, thereby to adjust the rotational speed of the rotary part.

[3] The electric generator device according to the above [1] or [2], wherein the swinging part is swingably secured to a housing, and the vibration energy generating part is supported by the housing.

[4] The electric generator device according to any one of the above [1] to [3], wherein the electric generator part comprises
  a first electrode,
  a second electrode disposed to face the first electrode, and
  a charge holding part which is provided on at least one of the first electrode and the second electrode.

[5] The electric generator device according to the above [4], wherein the charge holding part is one having an electric charge injected to a resin film made of a fluorinated polymer.

[6] The electric generator device according to the above [5], wherein the fluorinated polymer has a relative dielectric constant of from 1.8 to 8, a volume resistivity of from $10^{10}$ Ωcm to $10^{20}$ Ωcm and a dielectric breakdown strength of from 10 to 25 kV/mm.

[7] The electric generator device according to the above [5] or [6], wherein the fluorinated polymer is one obtained by using a fluorinated polymer (a) having an aliphatic ring in the main chain or a derivative (a') of the fluorinated polymer (a).

[8] The electric generator device according to the above [7], wherein the fluorinated polymer (a) is a polymer (I) having repeating units based on a cyclic fluorinated monomer, or a polymer (II) having repeating units formed by cyclopolymerization of a diene-type fluorinated monomer.

[9] The electric generator device according to the above [7] or [8], wherein the derivative (a') of the fluorinated polymer (a) is a mixture of the fluorinated polymer (a) and the following another component other than the fluorinated polymer (a), or a reaction product of the fluorinated polymer (a) and said another component other than the fluorinated polymer (a):
  another component: a silane coupling agent or a polyvalent polar compound having a molecular weight of from 50 to 2,000 and having at least two polar functional groups.

[10] A timepiece movement provided with the electric generator device as defined in any one of the above [1] to [9].

[11] A timepiece provided with the timepiece movement as defined in the above [10].

Advantageous Effects of Invention

According to the electric generator device [1], as it has a storage part to store the swing power of the swinging part, even a swing power due to an irregular external swing such as environmental vibration, can be temporarily stored in the storage part. Further, it is provided with the vibration energy generating part to generate, by the power stored at the storage part, vibration energy with its amplitude and frequency adjusted, whereby the power temporarily stored at the storage part can be generated as vibration energy having its amplitude and frequency adjusted. Thus, the electric generator part can convert the vibration energy to an electric power with good efficiency, whereby it is possible to provide an electric generator device excellent in power generation efficiency.

According to the electric generator device in the above [2], the vibration energy generating part has a pendulum to be in contact with a rotary part which is rotated by power stored at the storage part, thereby to adjust the rotational speed of the rotary part, whereby it is possible to accurately adjust the rotational speed of the rotary part and accurately vibrate the pendulum with a predetermined cycle. Therefore, the vibration energy generating part can generate vibration energy having its amplitude and frequency adjusted accurately, whereby it is possible to provide an electric generator device excellent in power generation efficiency.

According to the electric generator device in the above [3], it is possible to provide an electric generator device on a housing which is movable, for example, by carrying it. Thus, by utilizing environmental vibration, it is possible to store the swing power of the swinging part at the storage part.

According to the electric generator device in the above [4], a charge holding part is provided on at least one of the first electrode and the second electrode, whereby due to an increase or decrease of the overlapping area between the charge holding part and at least the other of the first electrode and the second electrode, the electric charge of at least the other electrode is increased or decreased. Therefore, the electric generator device can perform power generation by taking out the change in electric charge as an electric power.

According to the electric generator device in the above [5] to [9], the charge holding part can be made to be able to hold a larger electric charge.

According to the timepiece movement in the above [10] and the timepiece in the above [11], it is possible to provide a timepiece movement and timepiece capable of power generation. Especially, in a case where the timepiece is a wristwatch, it is possible to efficiently generate electric power by utilizing vibration (environmental vibration) during the user's walking as the external vibration.

DESCRIPTION OF EMBODIMENTS

Hereinafter, embodiments of the present invention will be described with reference to the accompanying drawings.

Figure 1:
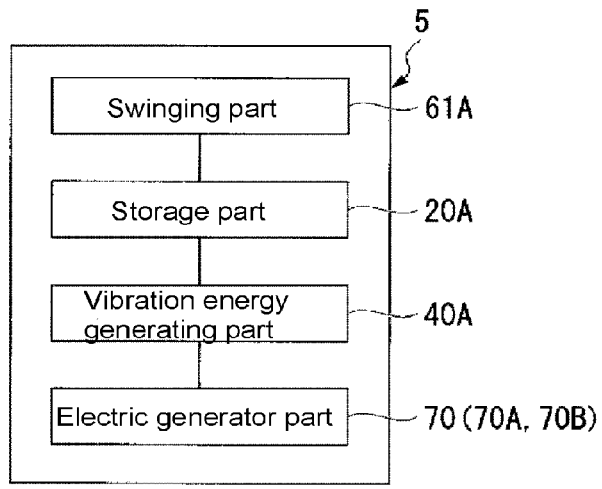
FIG. 1 is a block diagram of an electric generator device 5.

As shown in FIG. 1, an electric generator device 5 is constituted by a swinging part 61A, a storage part 20A, a vibration energy generating part 40A, and an electric generator part 70 (70A, 70B). In the following, the respective constituting components of the electric generator device 5 will be described in detail.

Figure 2:
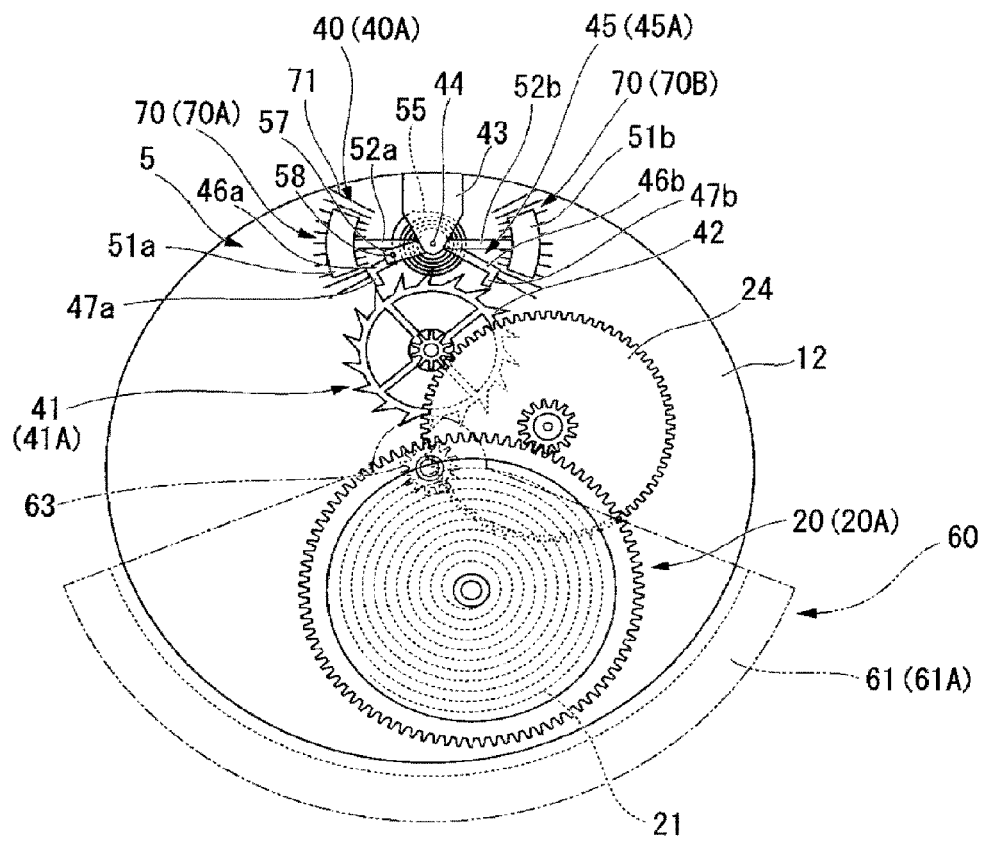
FIG. 2 is a schematic configuration diagram of an electric generator device 5 according to one embodiment of the present invention.

As shown in FIG. 2, the swinging part 61A is provided with a rotary weight 61 which swings positionally with respect to the housing 12 by external swing such as environmental vibration. The rotary weight 61 is formed in a substantially fan shape in plan view, and is provided so that it is rotatable about the central axis of the electric generator device 5.

At the rotational center of the rotary weight 61, a ratchet 63 is provided. The ratchet 63 is designed to transmit only the rotation in one direction of the rotary weight 61 to the storage part 20A.

The storage part 20A is provided with a barrel wheel 20. The barrel wheel 20 is supported rotatably to the housing 12 and has a spiral spring 21 therein. The spiral spring 21 is adapted to be wound up as the rotary weight 61 is rotated by external variation.

In the barrel wheel 20, the swing power from the swinging part 61A is stored. Specifically, as the rotary weight 61 being the swinging part 61A is rotated, the spiral spring 21 inside of the barrel wheel 20 is wound up via the ratchet 63, whereby the swing power of the rotary weight 61 is stored as a power in the spiral spring 21.

Figure 3:
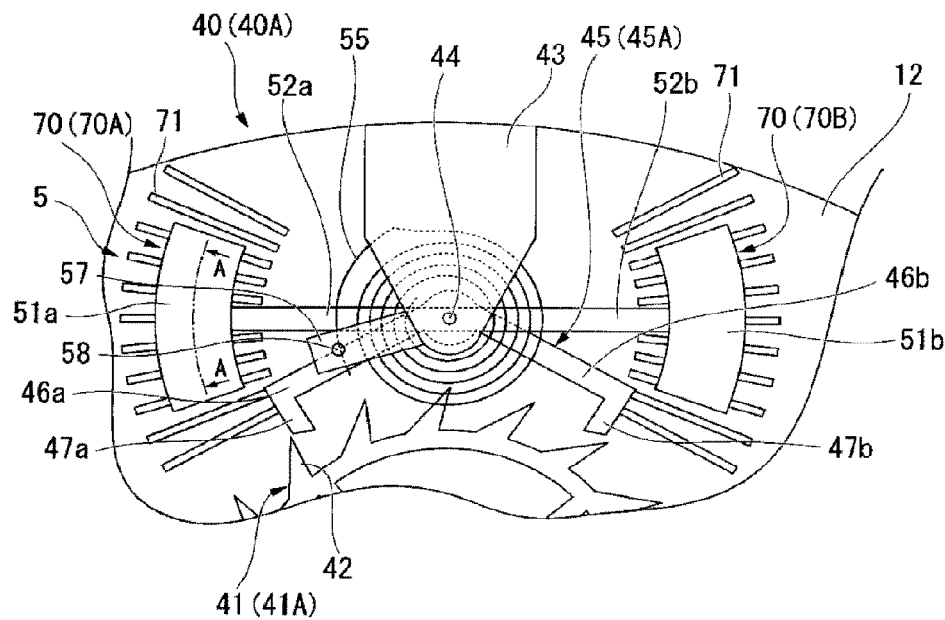
FIG. 3 is an enlarged view of a vibration energy generating part 40A.

As shown in FIG. 3, the vibration energy generating part 40A is constituted by an escapement governor 40 comprising an escape wheel 41, an anchor 45 and a balance spring 55.

Along the outer periphery of the escape wheel 41, teeth 42 are formed.

The anchor 45 is supported between the housing 12 and an anchor receptacle 43 rotatably around the anchor center 44. The anchor 45 is formed by a pair of anchor beams 46a and 46b in a V-shape opened to the escape wheel 41 side.

At the tips of the pair of anchor beams 46a and 46b, respectively, nail stones 47a and 47b are provided. The nail stones 47a and 47b of the anchor 45 may, respectively, engage the teeth 42 of the escape wheel 41 to temporarily stop the rotation of the escape wheel 41.

The anchor 45 is provided with a pair of vibrators 51a and 51b. The pair of vibrators 51a and 51b are plate members each formed in an arc shape having a predetermined curvature around the anchor center 44. The pair of vibrators 51a and 51b are located on both sides of the anchor center 44 in a radial direction with the anchor center 44 inbetween. The pair of vibrators 51a and 51b are connected to the anchor beams 46a and 46b, respectively, via arms 52a and 52b. Thus, the pair of vibrators 51a and 51b are adapted to reciprocally rotate (i.e. vibrate) about the anchor center 44 in a constant cycle, together with the anchor beams 46a and 46b.

A balance spring 55 is, for example, made of a metal material such as iron or nickel, and is a spiral flat spring member having a plurality of turns. Of the balance spring 55, one end at the inner peripheral side is fixed to the vicinity of the anchor center 44 of the anchor 45, and the other end at the outer peripheral side is fixed to a balance spring hook 58 of the balance spring receptacle 57 extending from e.g. the anchor receptacle 43. The balance spring 55 lets, by the spring force generated by scaling, the anchor 45 and the pair of vibrators 51a and 51b be vibrated at a predetermined cycle.

The vibration energy generating part 40A generates, by the power stored in the storage part 20A, vibration energy having its amplitude and frequency adjusted.

Specifically, the spiral spring 21 of the barrel wheel 20 being the storage part 20A is wound up, so that the power is stored as a restoring force of the spiral spring 21. The barrel wheel 20 is rotated by the power stored in the spiral spring 21, and via a transmission gear 24, the power is transmitted to the escape wheel 41 of the escapement governor 40 which is the vibration energy generating part 40A. That is, the escape wheel 41 is a rotary part 41A to be rotated by the power stored at the storage part 20A.

The rotational speed of the escape wheel 41 is adjusted by the anchor 45. Specifically, one nail stone 47a and the other nail stone 47b of the anchor 45 are respectively alternately engaged and disengaged with the teeth 42 of the escape wheel 41 so that the escape wheel 41 is allowed to undergo escapement at a constant speed. That is, the anchor 45 functions as a pendulum 45A to adjust the rotational speed of the rotary part 41A.

The anchor 45 is reciprocally rotated around the anchor center 44 with a constant amplitude and frequency around the anchor center 44 by the energy due to scaling of the balance spring 55 and by a collision energy to be applied when the nail stones 47a and 47b are in contact with the escape wheel 41. Thus, the vibration energy generating part 40A can generate vibration energy having its amplitude and frequency adjusted, from the vibrators 51a and 51b of the anchor 45.

The electric generator part 70 is to convert the vibration energy generated by the vibration energy generating part 40A to an electric power, and is constituted by vibrators 51a and 51b of the anchor 45, and the housing 12. Here, the electric generator part 70A formed by one vibrator 51a of the anchor 45 and the housing 12, and the electric generator part 70B formed by the other vibrator 51b and the housing 12, have the same structure, respectively. Therefore, in the following, description will be made with respect to only the electric generator part 70A formed by one vibrator 51a of the anchor 45 and the housing 12, and description will be omitted with respect to the electric generator part 70B formed by the other vibrator 51b of the anchor 45 and the housing 12.

Figure 4:
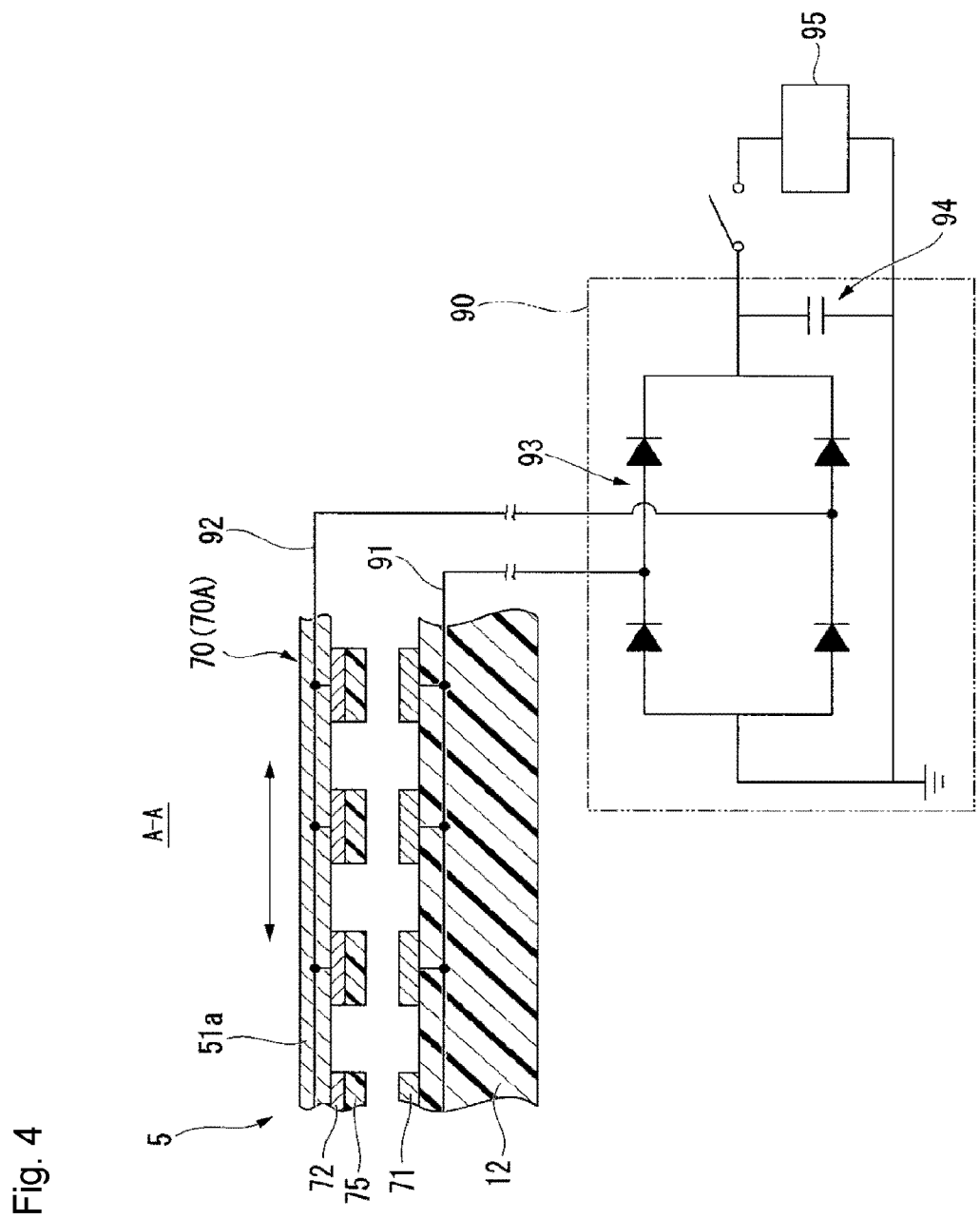
FIG. 4 is a cross-sectional view along the line A-A in FIG. 3 and an explanatory diagram illustrating schematically a circuit diagram of a rectifier circuit of the electric generator device.

FIG. 4 is a sectional view along the line A-A in FIG. 3, and an explanatory view schematically showing a circuit diagram of a rectifier circuit 90 of the electric generator device 5.

As shown in FIG. 4, the electric generator part 70A comprises a first electrode 71, a second electrode 72 and an electret film 75 (corresponding to "charge holding portion" in claims).

As shown in FIG. 3, the first electrode 71 is, for example, made of a metal material having conductivity such as copper, gold, silver, aluminum, iron, etc., and is formed on the surface of the housing 12 by e.g. sputtering technique, etc. The first electrode 71 is in the form of strips along the radial direction around the anchor center 44 and is patterned so that a plurality of strips are lined at a predetermined pitch in a circumferential direction around the anchor center 44.

The range where a plurality of first electrode 71 are formed is made sufficiently wider than the movable range when the vibrator 51a vibrates. Further, the length of the plurality of first electrode 71 is made sufficiently longer than the width along the radial direction of the vibrator 51a formed in an arc shape. Thus, it is so designed that at the time of vibration of the vibrator 51a, the first electrode 71 and the vibrator 51a will always overlap in a plan view.

As shown in FIG. 4, the plurality of first electrodes 71 are respectively electrically connected via a connecting wire 91 and are electrically connected to a rectifier circuit 90 which will be described later.

The second electrode 72 is, like the first electrode 71, made of e.g. a metal material having conductivity such as copper, gold, silver, aluminum, iron, etc. and is formed on the surface at the housing 12 side, of the vibrator 51a, by e.g. sputtering technique, etc. The second electrode 72 is in the form of strips along the radial direction of the vibrator 51a, and is patterned so that the plurality of strips are lined at a predetermined pitch in a circumferential direction of the vibrator 51a. The plurality of second electrode 72 are respectively electrically connected via a connecting wire 92 and are electrically connected to a rectifier circuit 90 which will be described later. The second electrode 72 functions as a current collector to collect the electric charge of the electret film 75 which will be described later.

The second electrode 72 is provided with an electret film 75 on its surface. The electret film 75 is formed on the surface of the second electrode 72, so that corresponding to the patterning of the second electrode 72, it is formed in strips along the radial direction of the vibrator 51a and patterned so that the plurality of strips are lined at a predetermined pitch along the circumferential direction of the vibrator 51a. As the charge holding medium constituting the electret film 75 (charge holding part), an insulating material which has been commonly used for electrets, may be used. The insulating material may be an organic insulating material or an inorganic insulating material.

As the organic insulating material, a fluorinated polymer (fluororesin) such as polytetrafluoroethylene (PTFE), a tetrafluoroethylene/perfluoroalkyl vinyl ether copolymer (PFA), a tetrafluoroethylene/hexafluoropropylene copolymer (FEP) or a tetrafluoroethylene/ethylene copolymer (ETFE); a hydrocarbon-based polymer such as polypropylene, polystyrene or a cycloolefin copolymer; a polycarbonate; and a material derived from these polymers, may be mentioned.

The material derived from polymers may, for example, be a mixture of a polymer and another component other than the polymer, or a reaction product of a polymer and another component other than the polymer.

As the inorganic insulating material, a silicon oxide film, a silicon nitride film, etc. formed by thermal oxidation or plasma CVD, may be mentioned.

As the charge holding part, a resin film made of a fluorinated polymer is preferred, since it has a high insulating property and low water absorption. Further, a polymer having an aliphatic ring structure in its main chain, or a resin film made of a material derived from such a polymer, is preferred, since it is excellent in stability (both of room temperature stability and stability during heating) of the surface potential value and charge retention. As the charge holding part, a resin film (hereinafter referred to also as the resin film (A)) made of a fluorinated polymer (a) having an aliphatic ring in the main chain, or a derivative (a') of the fluorinated polymer (a), is particularly preferred. Further, the resin film (A) may be formed by wet coating (a coating method using a solution) and is excellent in precision processability and excellent in applicability to parts to be used for rotational movement.

By using the fluorinated polymer (a) or a derivative (a') thereof, the resin film (A) has a high charge retention performance, and an electret formed by injecting electric charge into the resin film (A) has a high surface charge density. (Resin film (A))

The resin film (A) is formed by using a fluorinated polymer (a) having an aliphatic ring in the main chain, or a derivative (a') of the fluorinated polymer (a), i.e. it is composed mainly of the fluorinated polymer (a) or its derivative (a').

The derivative (a') will be described in detail later, and may, for example, be a mixture of the fluorinated polymer (a) and another component other than the fluorinated polymer (a), or a reaction product of the fluorinated polymer (a) and another component other than the fluorinated polymer (a). In a case where the resin film (A) contains the reaction product, a part of the fluorinated polymer (a) or another component used in forming the reaction product may be left unreacted in the resin film (A).

<Fluorinated Polymer (a)>

The fluorinated polymer (a) is a fluorinated polymer having an aliphatic ring in the main chain.

In the fluorinated polymer (a), fluorine atoms may be bonded to carbon atoms constituting the main chain or may be bonded to a side chain. It is preferred that fluorine atoms are bonded to carbon atoms constituting the main chain, since such is suitable for an electret having a low water absorption and low dielectric constant, a high breakdown voltage and a high volume resistivity.

The expression "having an aliphatic ring in the main chain" means that at least one of carbon atoms constituting the ring skeleton of the aliphatic ring, is a carbon atom constituting the main chain of the fluorinated polymer (a).

For example, in a case where the fluorinated polymer (a) is one obtained by polymerization of a monomer having a polymerizable double bond, at least one of carbon atoms derived from the polymerizable double bond of the monomer used in the polymerization, becomes a carbon atom constituting the main chain. For example, in a case where the fluorinated polymer (a) is a fluorinated polymer obtained by polymerizing a cyclic monomer as described later, two carbon atoms constituting a polymerizable double bond of the cyclic monomer become carbon atoms constituting the main chain. Further, in the case of a fluorinated polymer obtained by cyclopolymerization of a monomer having two polymerizable double bonds, at least two among the four carbon atoms constituting the two polymerizable double bonds become carbon atoms constituting the main chain.

The "aliphatic ring" means a ring having no aromaticity. The aliphatic ring may be saturated or unsaturated. The aliphatic ring may be one wherein the ring skeleton has a carbocyclic structure composed solely of carbon atoms, or one wherein the ring skeleton has a heterocyclic structure containing an atom (hetero atom) other than carbon atoms. Such a hetero atom may, for example, be an oxygen atom, a nitrogen atom or the like.

The number of atoms constituting the ring skeleton of the aliphatic ring is preferably from 4 to 7 atoms, particularly preferably 5 or 6. That is, the aliphatic ring is preferably a 4- to 7-membered ring, particularly preferably a 5- or 6-membered ring.

The aliphatic ring may or may not have a substituent. The expression "which may have a substituent" means that a substituent (an atom or group other than a hydrogen atom) may be bonded to an atom constituting the ring skeleton of the aliphatic ring.

The aliphatic ring may be a non-fluorinated aliphatic ring or may be a fluorinated aliphatic ring.

The non-fluorinated aliphatic ring is an aliphatic ring containing no fluorine atoms in its structure. The non-fluorinated aliphatic ring may, specifically, be a saturated or unsaturated aliphatic hydrocarbon ring, or an aliphatic heterocyclic ring having a part of carbon atoms in the aliphatic hydrocarbon ring is substituted with a hetero atom such as an oxygen atom, a nitrogen atom or the like.

The fluorinated aliphatic ring is an aliphatic ring containing fluorine atom(s) in its structure. The fluorinated aliphatic ring may, for example, be an aliphatic ring wherein a substituent containing fluorine atom(s) (hereinafter referred to as a fluorinated group) is bonded to a carbon atom constituting the ring skeleton of the aliphatic ring. The fluorinated group may, for example, be a fluorine atom, a perfluoroalkyl group, a perfluoroalkoxy group, or $=CF_2$.

The fluorinated aliphatic ring or non-fluorinated aliphatic ring may have a substituent other than a fluorinated group.

The aliphatic ring is preferably a fluorinated aliphatic ring from the viewpoint of excellent charge retention performance.

As preferred fluorinated polymers (a), the following fluorinated cyclic polymer (I) and fluorinated cyclic polymer (II) may be mentioned.

Fluorinated cyclic polymer (I): a polymer having units based on a cyclic fluorinated monomer.

Fluorinated cyclic polymer (II): a polymer having units formed by cyclopolymerization of a diene-type fluorinated monomer.

The "cyclic polymer" means a polymer having a cyclic structure.

The "units" refers to repeating units constituting a polymer.

Hereinafter, a compound represented by the formula (1) may be referred to also as a "compound (1)". Units, compounds, etc. represented by other formulae, may also be referred to similarly, and, for example, units represented by the formula (3-1) may be referred to also as "units (3-1)".

The fluorinated cyclic polymer (I) has units based on a cyclic fluorinated monomer.

The "cyclic fluorinated monomer" is a monomer having a polymerizable double bond between carbon atoms constituting a fluorinated alicyclic ring, or a monomer having a polymerizable double bond between a carbon atom constituting a fluorinated alicyclic ring and a carbon atom outside of the fluorinated alicyclic ring.

As the cyclic fluorinated monomer, the following compound (1) or compound (2) is preferred.

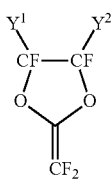

(2)

[In the formulae, $X^1$, $X^2$, $X^3$, $X^4$, $Y^1$ and $Y^2$ are each independently a fluorine atom, a perfluoroalkyl group which may contain an etheric oxygen atom (—O—), or a perfluoroalkoxy group which may contain an etheric oxygen atom. $X^3$ and $X^4$ may be bonded to each other to form a ring.]

The perfluoroalkyl group for $X^1$, $X^2$, $X^3$, $X^4$, $Y^1$ and $Y^2$ preferably has from 1 to 7 carbon atoms, and particularly preferably has from 1 to 4 carbon atoms. The perfluoroalkyl group is linear or branched, preferably linear. Specifically, a trifluoromethyl group, a pentafluoroethyl group or a heptafluoropropyl group may be mentioned, and a trifluoromethyl group is particularly preferred.

The perfluoroalkoxy group for $X^1$, $X^2$, $X^3$, $X^4$, $Y^1$ and $Y^2$, may be one having an oxygen atom (—O—) bonded to the above perfluoroalkyl group, and a trifluoromethoxy group is particularly preferred.

In the formula (1), $X^1$ is preferably a fluorine atom.

$X^2$ is preferably a fluorine atom, a trifluoromethyl group or a $C_{1-4}$ perfluoroalkoxy group, particularly preferably a fluorine atom or a trifluoromethoxy group.

$X^3$ and $X^4$ each independently is preferably a fluorine atom or a $C_{1-4}$ perfluoroalkyl group, particularly preferably a fluorine atom or a trifluoromethyl group.

$X^3$ and $X^4$ may be bonded to each other to form a ring. The number of atoms constituting the ring skeleton of the ring is preferably from 4 to 7, particularly preferably 5 or 6.

Preferred specific examples of the compound (1) include compounds (1-1) to (1-5).

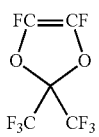

(1-1)

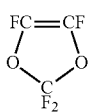

(1-2)

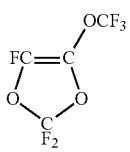

(1-3)

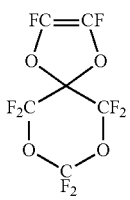

(1-4)

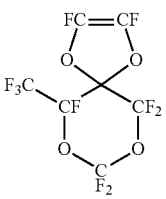

(1-5)

In the formula (2), $Y^1$ and $Y^2$ are each independently a fluorine atom, a $C_{1-4}$ perfluoroalkyl group or a $C_{1-4}$ perfluoroalkoxy group, particularly preferably a fluorine atom or a trifluoromethyl group.

As a preferred specific example of the compound (2), compound (2-1) or (2-2) may be mentioned.

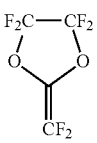

(2-1)

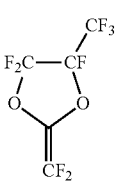

(2-2)

The fluorinated cyclic polymer (I) may be composed solely of units formed by the cyclic fluorinated monomer, or a copolymer having such units and other units.

However, in the fluorinated cyclic polymer (I), the proportion of units based on the cyclic fluorinated monomer, is at least 20 mol %, more preferably at least 40 mol %, and may be 100 mol %, to the total of all repeating units constituting the fluorinated cyclic polymer (I).

Another monomer is not particularly limited, so long as it is compolymerizable with the cyclic fluorinated monomer. Specifically, a diene-type fluorinated monomer, a monomer having a reactive functional group in a side chain, tetrafluoroethylene, chlorotrifluoroethylene, perfluoro(methyl vinyl ether), etc. may be mentioned. The diene-type fluorinated monomer may be the same ones as mentioned in the description of the fluorinated cyclic polymer (II) to be described later. The monomer having a reactive functional group in a side chain may be a monomer having a polymerizable double bond and a reactive functional group. The polymerizable double bond may, for example, be $CF_2$=$CF$—, $CF_2$=$CH$—, $CH_2$=$CF$—, $CFH$=$CF$—, $CFH$=$CH$—, $CF_2$=$C$—, $CF$=$CF$—, etc. The reactive functional group may be the same ones as mentioned in the description of the fluorinated cyclic polymer (II) to be described later.

Here, a polymer obtained by copolymerization of a cyclic fluorinated monomer and a diene-type fluorinated monomer is regarded as the fluorinated cyclic polymer (I).

The fluorinated cyclic polymer (II) has units formed by cyclopolymerization of a diene-type fluorinated monomer.

The "diene-type fluorinated monomer" is a monomer having two polymerizable double bonds and fluorine atoms. The polymerizable double bond is, although not particularly limited thereto, preferably a vinyl group, an allyl group, an acryloyl group or a methacryloyl group.

As the diene-type fluorinated monomer, the following compound (3) is preferred.

$CF_2=CF-Q-CF=CF_2$ (3).

In the formula (3), Q is a $C_{1-5}$, preferably $C_{1-3}$, perfluoroalkylene group which may have a branch and which may contain an etheric oxygen atom, wherein some of fluorine atoms may be substituted with a halogen atom other than a fluorine atom. Such a halogen atom other than a fluorine atom may, for example, be a chlorine atom or a bromine atom.

Q is preferably a perfluoroalkylene group containing an etheric oxygen atom. In that case, an etheric oxygen atom in the perfluoroalkylene group may be present at one terminal of the group, or may be present at both terminals of the group, or may be present between carbon atoms of the group. From the viewpoint of cyclopolymerizability, it is preferably present at one terminal of the group. Specific examples of the compound (3) include the following compounds.

$CF_2=CFOCF_2CF=CF_2$, $CF_2=CFOCF(CF_3)CF=CF_2$, $CF_2=CFOCF_2CF_2CF=CF_2$, $CF_2=CFOCF_2CF(CF_3)CF=CF_2$, $CF_2=CFOCF(CF_3)CF_2CF=CF_2$, $CF_2=CFOCFClCF_2CF=CF_2$, $CF_2=CFOCCl_2CF_2CF=CF_2$, $CF_2=CFOCF_2OCF=CF_2$, $CF_2=CFOC(CF_3)_2OCF=CF_2$, $CF_2=CFOCF_2CF(OCF_3)CF=CF_2$, $CF_2=CFCF_2CF=CF_2$, $CF_2=CFCF_2CF_2CF=CF_2$, $CF_2=CFCF_2OCF_2CF=CF_2$.

Units formed by cyclopolymerization of the compound (3) may, for example, be the following units (3-1) to (3-4).

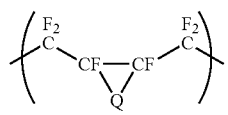
(3-1)

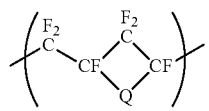
(3-2)

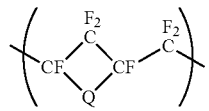
(3-3)

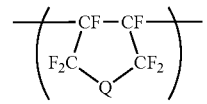
(3-4)

The fluorinated polymer (a) preferably has a reactive functional group.

The "reactive functional group" means a group having a reactivity, that may form a bond by reacting between molecules of this fluorinated polymer (a), or with another component which is blended together with the fluorinated polymer (a), when subjected to heating or the like.

For example, in a case where, as said another component, a silane coupling agent or a compound having a molecular weight of from 50 to 2,000 having two or more polar functional groups (excluding a silane coupling agent, hereinafter referred to as a polyvalent polar compound) to be mixed, and the mixture is reacted to form a reaction product, it is preferred that the fluorinated polymer (a) has a reactive functional group capable of reacting with a functional group of the silane coupling agent or with the polar functional groups of the polyvalent polar compound.

The reactive functional group of the fluorinated polymer (a) is preferably at least one member selected from the group consisting of a carboxy group, an acid halide group, an alkoxycarbonyl group, a carbonyloxy group, a carbonate group, a sulfo group, a phosphono group, a hydroxy group, a thiol group, a silanol group and an alkoxysilyl group, particularly preferably a carboxy group or an alkoxycarbonyl group, in view of the efficiency for the introduction to the polymer and in consideration of the strength of the interaction with the silane coupling agent or polyvalent polar compound.

The reactive functional group may be bonded to a terminal of the main chain of the fluorinated polymer (a), or may be bonded to a side chain. From the viewpoint of production efficiency, it is preferably bonded to a terminal of the main chain. That is, the most preferred embodiment of the fluorinated polymer (a) is that it has a carboxy group or an alkoxycarbonyl group at a terminal of the main chain.

The relative dielectric constant of the fluorinated polymer (a) is preferably from 1.8 to 8, more preferably from 1.8 to 5, further preferably from 1.8 to 3, particularly preferably from 1.8 to 2.7, most preferably from 1.8 to 2.3. When the relative dielectric constant is at least the lower limit value in the above range, the amount of electric charge which can be stored as an electret is high, and when it is at most the upper limit value, the electrical insulation property and the charge retention stability as an electret will be excellent. The relative dielectric constant is measured in accordance with ASTM D150, at a frequency of 1 MHz.

Further, the resin film (A) is a part responsible for charge retention as an electret, and therefore, as the fluorinated polymer (a), one having a high volume resistivity and a high dielectric breakdown strength is preferred.

The volume resistivity of the fluorinated polymer (a) is preferably from $10^{10}$ to $10^{20}$ Ωcm, particularly preferably from $10^{16}$ to $10^{19}$ Ωcm. The volume resistivity is measured by ASTM D257.

The dielectric breakdown strength of the fluorinated polymer (a) is preferably from 10 to 25 kV/mm, particularly preferably from 15 to 22 kV/mm. The dielectric breakdown strength is measured by ASTM D149.

The refractive index of the fluorinated polymer (a) is preferably from 1.2 to 2, particularly preferably from 1.2 to 1.5, in order to decrease the difference in refractive index from the substrate, to suppress the interference of light due to the birefringence, and to secure transparency.

The weight average molecular weight (Mw) of the fluorinated polymer (a) is preferably at least 50,000, more preferably at least 150,000, further preferably at least 200,000, particularly preferably at least 250,000. When Mw is at least 50,000, film formation will be easy. In particular, when it is at least 200,000, the heat resistance of the film will be improved, and when formed into an electret, the thermal stability of the retained electric charge will be improved. On the other hand, if the weight average molecular weight (Mw) is too large, it tends to be hardly dissolved in a solvent, whereby there may be a problem such that the film forming process may be restricted. Accordingly, the weight average molecular weight (Mw) of the fluorinated polymer (a) is preferably at most 1,000,000, more preferably at most 850,000, further preferably at most 650,000, particularly preferably at most 550,000.

In this specification, the weight average molecular weight (Mw) of the fluorinated polymer (a) is a value calculated by using the relational expression ($[\eta]=1.7\times10^{-4}\times Mw^{0.60}$) between Mw and the intrinsic viscosity $[\eta]$ (30° C.), as disclosed in Journal of the Chemical Society of Japan, 2001, NO. 12, P. 661.

The intrinsic viscosity $[\eta]$ (30° C.) (unit: dl/g) is a value measured by a Ubbelohde viscometer at 30° C. by using perfluoro(2-butyl tetrahydrofuran) as a solvent.

As the fluorinated polymer (a), one produced by polymerizing the above-mentioned monomer may be used, or a commercial product may be used.

As a commercial product of a fluorinated polymer having a fluorinated aliphatic ring containing an etheric oxygen atom in the main chain and having a carboxy group or alkoxycarbonyl group at a terminal of the main chain, CYTOP (registered trademark, manufactured by Asahi Glass Company, Limited) may be mentioned.

Further, as a commercial product of a copolymer (fluorinated polymer) of the compound (1-1) and tetrafluoroethylene, Teflon-AF (trademark, manufactured by DuPont) may be mentioned.

<Derivative (a')>

As the derivative (a'), as described above, a mixture of the fluorinated polymer (a) and another component other than the fluorinated polymer (a), or a reaction product of the fluorinated polymer (a) and another component other than the fluorinated polymer (a), may, for example, be mentioned.

Said mixture is different from the reaction product, and is in a state where the fluorinated polymer (a) and another component other than the fluorinated polymer (a), are mixed without being reacted.

The reaction product may, for example, be one formed by a reaction of components at the time of heating a coating liquid having the fluorinated polymer (a) and another component dissolved in a solvent (e.g. baking at the time of film formation by evaporating the solvent). Here, the fluorinated polymer (a) and another component other than the fluorinated polymer (a) which remain without being reacted at the time of reacting the fluorinated polymer (a) and another component other than the fluorinated polymer (a), are regarded as the mixture.

Another component to be mixed or reacted with the fluorinated polymer (a) is preferably a silane coupling agent or a polyvalent polar compound, particularly preferably a silane coupling agent. It is thereby possible to improve the charge retention performance (the thermal stability and stability with time of the retained electric charge, etc.) of the resin film (A) to be formed. The effect for improving the charge retention performance is particularly remarkable when the fluorinated polymer (a) has a carboxy group or an alkoxycarbonyl group at a terminal of the main chain.

The effect for improving the charge retention performance is considered to be such that the fluorinated polymer (a) and the silane coupling agent or polyvalent polar compound undergo a nanophase separation, whereby a nano cluster structure derived from the silane coupling agent or polyvalent polar compound is formed, and the nano cluster structure functions as a site for storing electric charge in the electret.

In the derivative (a'), the silane coupling agent or polyvalent polar compound may be present in such a state that its molecules are reacted with each other.

The silane coupling agent is not particularly limited, and a wide range of silane coupling agents including those known or well-known, may be used.

As the silane coupling agent, a silane coupling agent having an amino group is preferred.

In consideration of availability, particularly preferred as the silane coupling agent is at least one member selected from γ-aminopropylmethyldiethoxysilane, γ-aminopropylmethyldimethoxysilane, γ-aminopropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane, and N-(β-aminoethyl)-γ-aminopropyltriethoxysilane.

Silane coupling agents may be used alone, or may be used in combination of two or more of them.

The amount of the silane coupling agent is preferably from 0.1 to 20 mass %, more preferably from 0.3 to 10 mass %, particularly preferably from 0.5 to 5 mass %, to the total amount of the fluorinated polymer (a) and the silane coupling agent. In the above-mentioned range, a homogeneous solution can easily be obtained when the coating solution is prepared by dissolving it together with the fluorinated polymer (a) in a solvent.

The polyvalent polar compound is preferably a compound having a molecular weight of from 50 to 2,000 and having at least two polar functional groups (provided that a silane coupling agent is excluded), particularly preferably a compound having a molecular weight of from 100 to 2,000 (provided that a silane coupling agent is excluded). When the molecular weight of the poyvalent polar compound is at least the lower limit value in the above range, volatility is low due to the high molecular weight, whereby it becomes easy to be retained in the film after film formation. Further, when it is at most the upper limit value in the above range, compatibility with the fluorinated polymer (a) will be good.

The "polar functional group" is a functional group having either one or both of the following characteristics (1a) and (1b).

(1a) containing at least two types of atoms different in electronegativity and having a polarity due to polarization in the functional group.

(1b) producing polarization due to the difference in electronegativity between the functional group and carbon to which it is bonded.

As a specific example of the polar functional group having only the above characteristic (1a), a hydroxyphenyl group may be mentioned.

As a specific example of the polar functional group having only the above characteristic (1b), a primary amino group (—NH₂), a secondary amino group (—NH—), a hydroxy group or a thiol group may be mentioned.

As a specific example of the polar functional group having both of the above characteristics (1a) and (1b), a sulfo group, a phosphono group, a carboxy group, an alkoxycarbonyl group, an acid halide group, a formyl group, an isocyanate group, a cyano group, a carbonyloxy group (—C(O)—O—) or a carbonate group (—O—C(O)—O—), may be mentioned.

The polyvalent polar compound is preferably at least one member selected from the group consisting of pentane-1,5-diamine, hexane-1,6-diamine, cyclohexane-1,2-diamine, cyclohexane-1,3-diamine, cyclohexane-1,4-diamine, 1,2-diaminobenzene, 1,3-diaminobenzene, 1,4-diaminobenzene, triaminomethylamine, tris(2-aminoethyl)amine, tris(3-aminopropyl)amine, cyclohexane-1,3,5-triamine, cyclohexane-1,2,4-triamine, 1,3,5-triaminobenzene, 1,2,4-triaminobenzene, 2,4,6-triaminotoluene, 1,3,5-tris(2-aminoethyl)benzene, 1,2,4-tris(2-aminoethyl)benzene, 2,4,6-tris(2-aminoethyl)toluene, diethylenetriamine, triethylenetetramine, tetraethylenepentamine and polyethyleneimine, particularly preferably at least one member selected from the group consisting of tris(2-aminoethyl)amine, tris(3-aminopropyl)amine, cyclohexane-1,3-diamine, hexane-1,6-diamine, diethylenetriamine and polyethyleneimine.

The polyvalent polar compounds may be used alone, or in combination of two or more of them. For example, a compound having two polar functional groups may be used as mixed with a compound having at least three polar functional groups.

The blend amount of the polyvalent polar compound is preferably from 0.01 to 30 mass %, particularly preferably from 0.05 to 10 mass %, based on the amount of the fluorinated polymer (a). When the blend amount is at least the lower limit value in the above range, the effect of blending the polyvalent polar compound can be sufficiently obtained. When the blend amount is at most the upper limit value in the above range, miscibility with the fluorinated polymer (a) will be good, whereby the distribution in the coating liquid will be uniform.

The resin film (A) is particularly preferably formed of a mixture of a fluorinated polymer having a fluorinated aliphatic ring containing an etheric oxygen atom in the main chain and having a carboxy group or alkoxycarbonyl group at a terminal of the main chain, and a silane coupling agent having an amino group, or a reaction product of a fluorinated polymer having a fluorinated aliphatic ring containing an etheric oxygen atom in the main chain and having a carboxy group or alkoxycarbonyl group at a terminal of the main chain, and a silane coupling agent having an amino group.

(Method of forming resin film (A))

The method of forming the resin film (A) is not particularly limited, and it is possible to use a known method. For example, a method may be mentioned wherein a coating film is formed on the second electrode 72 side surface of the vibrator 51a having the second electrode 72 formed thereon, and the coating film is subjected to patterning to form a pattern corresponding to the second electrode 72.

The method for forming the coating film may, for example, be a method of forming a coating film by using a coating liquid having the fluorinated polymer (a) dissolved in a solvent, or a coating liquid having the fluorinated polymer (a) and another component other than the fluorinated polymer (a) dissolved in a solvent. As such another component, as mentioned above, a silane coupling agent or a polyvalent polar compound is preferred, and a silane coupling agent is particularly preferred.

As the solvent, a solvent capable of dissolving at least the fluorinated polymer (a) is used, and when another component is contained, if the solvent for dissolving the fluorinated polymer (a) is one which dissolves said another component, it is possible to obtain a uniform solution by the solvent alone. Otherwise, another solvent to dissolve said another component may be used in combination.

Specific examples of the solvent include protic solvents, aprotic solvents, etc., and among them, one capable of dissolving components to be blended in the coating liquid may be suitably chosen.

A "protic solvent" is a solvent having a proton donating ability. An "aprotic solvent" is a solvent which does not have a proton donating ability.

Protic solvents may, for example, be the following protic non-fluorinated solvents, protic fluorinated solvents, etc.

Protic non-fluorinated solvents such as methanol, ethanol, 1-propanol, isopropyl alcohol, 1-butanol, 2-butanol, tert-butyl alcohol, pentanol, hexanol, 1-octanol, 2-octanol, ethylene glycol, ethylene glycol monomethyl ether, propylene glycol monomethyl ether, propylene glycol monobutyl ether, propylene glycol, methyl lactate, etc.

Protic fluorinated solvents including a fluorinated alcohol such as 2-(perfluorooctyl)ethanol, a fluorinated carboxylic acid, an amide of a fluorinated carboxylic acid, a fluorinated sulfonic acid, etc.

Aprotic solvents may, for example, be the following aprotic non-fluorinated solvents, aprotic fluorinated solvents, etc.

Aprotic non-fluorinated solvents including hexane, cyclohexane, heptane, octane, decane, dodecane, decalin, acetone, cyclohexanone, 2-butanone, dimethoxyethane, monomethyl ether, ethyl acetate, butyl acetate, diglyme, triglyme, propylene glycol monomethyl ether monoacetate (PGMEA), N,N-dimethylformamide (DMF), N,N-dimethylacetamide (DMA), N-methylpyrrolidone, tetrahydrofuran, anisole, dichloromethane, dichloroethane, chloroform, carbon tetrachloride, chlorobenzene, dichlorobenzene, benzene, toluene, xylene, ethylbenzene, mesitylene, tetralin, methylnaphthalene, etc.

Aprotic fluorinated solvents including a polyfluoro aromatic compound such as 1,4-bis(trifluoromethyl)benzene, a polyfluorotrialkylamine compound such as perfluorotributylamine, a polyfluorocycloalkane compound such as perfluorodecalin, a polyfluorocyclic ether compound such as perfluoro(2-butyltetrahydrofuran), a perfluoropolyether, a polyfluoroalkane compound, hydro-fluoro-ether (HFE), etc.

These solvents may be used alone, or in combination of two or more of them. Further, in addition to these, a wide range of compounds may be used.

Among these, as the solvent to be used for dissolving the fluorinated polymer (a), an aprotic fluorinated solvent is preferred, since the solubility of the fluorinated polymer (a) is thereby high, and it is a good solvent.

As the solvent for dissolving the silane coupling agent or polyvalent polar compound, a protic fluorinated solvent is preferred.

The boiling point of the solvent is preferably from 65 to 220° C., particularly preferably from 100 to 220° C., since it is thereby easy to form a uniform film at the time of coating.

In the solvent to be used for preparing the coating liquid, it is preferred that the water content is low. The water content is preferably at most 100 mass ppm, particularly preferably at most 20 mass ppm.

The concentration of the fluorinated polymer (a) in the coating liquid is preferably from 0.1 to 30 mass %, particularly preferably from 0.5 to 20 mass %.

The solid content concentration in the coating liquid may be suitably set depending upon the film thickness to be formed. It is usually from 0.1 to 30 mass %, preferably from 0.5 to 20 mass %.

Here, the solid content is calculated by heating the coating liquid having its mass measured, at 200° C. for 1 hour under normal pressure to distill off the solvent, followed by measuring the mass of the remaining solid content.

The coating liquid may be obtained by preliminarily preparing a composition containing the respective components, followed by dissolving the composition in a solvent, or it may be obtained by dissolving the respective components in solvents, respectively, followed by mixing the respective solutions.

As the production method for the composition in the case of preliminarily preparing the composition containing the respective components, a solid and a solid, or a solid and a liquid, may be mixed by kneading, eutectic extrusion or the like, or respective solutions having respective components dissolved in the respective solvents, may be mixed. Among them, it is particularly preferred to mix the respective solutions.

In the case of using the fluorinated polymer (a) and the silane coupling agent in combination, it is preferred to obtain the coating liquid by separately preparing a polymer solution having the fluorinated polymer (a) dissolved in an aprotic fluorinated solvent, and a silane coupling agent solution having the silane coupling agent dissolved in a protic fluorinated solvent, and then, mixing the polymer solution and the silane coupling agent solution.

Formation of the coating film may, for example, be conducted by applying the coating liquid on the surface of a substrate, followed by drying, e.g. by baking.

The coating method is not particularly limited, and it is possible to use a conventional method for forming a film from a solution. Specific examples of such a method, include a spin coating method, a roll coating method, a casting method, a dipping method, a casting on water method, a Langmuir-Blodgett method, a die coating method, an inkjet method, a spray coating method, etc. Further, a printing technique such as a relief printing method, a gravure printing method, a planographic printing method, a screen printing method or a flexographic printing method may also be used.

Drying may be carried out by air drying at normal temperature, but it is preferably carried out by baking by heating. The baking temperature is preferably at least the boiling point of the solvent, and it is particularly preferred to carry out the baking at a high temperature at a level of at least 230° C., so that the reaction of the added silane coupling agent or polyvalent polar compound and the fluorinated polymer (a) is sufficiently completed.

In the case of forming the resin film (A) by using the above-described fluorinated polymer (a) or derivative (a') thereof, the surface of the substrate on which the resin layer (A) is to be formed, is preferably formed of chromium, aluminum, copper or the like, to secure the bonding to the substrate. If the surface of the substrate on which the resin layer (A) is to be formed, is formed of gold, platinum or pure nickel, bonding of the resin film (A) to the substrate tends to be difficult. Therefore, when the resin film (A) is to be formed on the vibrating plate 23, the surface of the vibrating plate 23 is preferably formed of a conductive material excluding gold, platinum and pure nickel, among the materials mentioned above as the material for forming the electrode film. Accordingly, if gold, platinum or pure nickel is employed as the main material for forming the vibrating plate 23, it is preferred to form a film of e.g. chromium or aluminum on the surface of gold, platinum or pure nickel.

A method for patterning the coating film is not particularly limited, and it is possible to employ a known patterning technique.

As a specific example, a method of forming a mask having a predetermined pattern on the coating film, followed by etching, may be mentioned.

The mask may, for example, be formed by the same method as the second electrode 72. However the material constituting the mask may be any one having a degree of etching selectivity, to the coating film, and may not be an electrically conductive material. For example, as the mask, a resist film patterned to have a pattern corresponding to the second electrode 72, may be used. Patterning of the resist film may be carried out by a known lithographic technique.

As a specific example for formation of the electret film 75, for example, in the embodiment of FIG. 4, a solution of perfluoro(2-butyltetrahydrofuran) containing CYTOP (registered trademark of Asahi Glass Company, Limited) and γ-aminopropylmethyldimethoxysilane, is applied on the material forming the second electrode 72, followed by heating to obtain a resin film (A), and by a lithography method, a second electrode is formed by processing together with the resin layer (A) and thereby injecting electric charge to form an electret film 75. (Injection of electric charge)

By injecting electric charge into the resin film (A), the resin film (A) can be made to be an electret film 75.

The method for injecting electric charge into the resin film (A) is not particularly limited as long as it is a method which generally electrically charge an insulator. For example, it is possible to apply a corona discharge method as disclosed in G. M. Sessler, Electrets Third Edition, pp20, Chapter2.2 "Charging and Polarizing Methods" (Laplacian Press, 1998), an electron beam collision method, an ion beam bombardment method, a radiation irradiation method, a light irradiation method, a contact charging method, a liquid contact charging method, etc. In the present invention, it is particularly preferred to use a corona discharge method or an electron beam collision method.

As a temperature condition for injecting electric charge, it is preferred to carry out the injection at a temperature of at least the glass transition temperature (Tg) of the fluorinated polymer (a) or its derivative (a') contained in the resin layer (A), from the viewpoint of the stability of electric charge maintained after the injection, and it is particularly preferred to carry out the injection under a temperature condition of about Tg+10° C. to Tg+20° C.

As a voltage to be applied at the time of injecting electric charge, it is preferred to apply a high voltage, provided that it is less than the breakdown voltage of the resin film (A). In the present invention, the voltage applied to the resin film (A) is a positive electric charge of from 6 to 30 kV, preferably from 8 to 15 kV, or a negative electric charge of from −6 to −30 kV, preferably from −8 to −15 kV.

The fluorinated polymer (a) or its derivative (a') is able to hold a negative electric charge more stably than a positive electric charge, and therefore, the voltage to be applied is preferably a negative electric charge. In such a case, the surface potential of the electret film 75 will be negative.

Here, a case of forming the resin film (A) directly on the second electrode 72 of a vibrator 51a which has the second electrode 72 formed on its surface and injecting electric charge, but the method for the production of the electret film 75 is not limited thereto. For example, a resin film (A) may be formed on an optional substrate, and after peeling it from the substrate, it may be disposed on a vibrator 51*a* having a second electrode 72 formed on its surface, followed by injecting electric charge to obtain an electret film 75. Otherwise, the resin film (A) may be formed on an optional substrate, followed by injection of electric charge to form an electret film 75, and then, the electret film 75 is peeled from the substrate and disposed on a vibrator 51*a* having an second electrode 72 formed on its surface.

In the case of forming a resin film (A) on a substrate separate from the vibrator 51*a*, if injection of electric charge is not carried out on the substrate, as such a substrate, any substrate may be used without particularly selecting its material.

In the case of forming a resin film (A) on a substrate separate from the vibrator 51*a*, if injection of electric charge is carried out on the substrate, as such a substrate, a substrate that can be grounded at the time of injecting electric charge to the obtained laminate, may be used. As a preferred material, a conductive metal may be mentioned, such as gold, silver, copper, nickel, chromium, aluminum, titanium, tungsten, molybdenum, tin, cobalt, palladium, platinum, or an alloy containing at least one of these as the main component. Further, even in the case of a material other than a conductive metal, e.g. a substrate (insulating substrate) made of insulating material, such as an inorganic material such as glass, or an organic material such as polyethylene terephthalate, polyimide, polycarbonate or acrylic resin, it is possible to use such a material, if its surface is coated with a metal film, a metal oxide such as ITO (Indium Tin Oxide), IZO (Indium Zinc Oxide), zinc oxide, titanium dioxide or tin oxide, or an organic conductive material made of polyaniline, polypyrrole, PEDOT/PSS (conductive composite comprising poly(3,4-ethylenedioxythiophene) and poly(4-styrenesulfonate)), carbon nanotubes or the like, by a method such as sputtering, vapor deposition, wet coating, etc. Further, a semiconductor material such as silicon may also be used as a substrate, if it is one subjected to the same surface treatment, or if the resistance value of the semiconductor material itself is low. The resistance of the substrate material is preferably at most 0.1 Ωcm, particularly preferably at most 0.01 Ωcm, by volume resistivity. If the substrate material has such a low resistance value, an electret may be made by directly injecting electric charge into a laminate formed on the substrate.

The rectifier circuit 90 of the electric generator device 5 comprises a bridge type rectifier circuit 93 and a smoothing circuit 94.

The bridge type rectifier circuit 93 is, for example, provided with four diodes, and at its input side, a first electrode 71 and a second electrode 72 being a current collector for the electret film 75, are connected via connection wirings 91 and 92, respectively. The output side of the bridge-type rectifier circuit 93 is connected to various electrical equipment 95, via a smoothing circuit 94 provided with a smoothing capacitor.

On the surface of the electret film 75, a positive or negative electric charge is retained, and therefore, on the inner surface of the oppositely disposed first electrode 71, an electric charge opposite to the surface of the electret film 75 (i.e. negative when the surface of the electret film 75 is positive, or positive when the surface of the electret film 75 is negative) is drawn by electrostatic induction. When the vibrator 51*a* vibrates to the housing 12 in conjunction with the rotation of the anchor 45 (see FIG. 3), the overlapping area between the electret film 75 and the first electrode 71 in a plan view (hereinafter referred to simply as the "overlapping area") will increase or decrease, and at the same time, the positive electric charge of the first electrode 71 will increase or decrease. In a static induction type electric generator device 5, the change in electric charge is taken out as electrical energy, to perform electric power generation. That is, the electric generator device 5 provided with a rectifier circuit 90 serves as a DC power source.

According to this embodiment, since it has a storage part 20A to store a swing power of a swinging part 61A, even a swing power by irregular external swing such as environmental vibration, can be temporarily stored in the storage part 20A. Further, it is provided with a vibration energy generating part 40A to generate, by the swing power stored in the storage part 20A, vibration energy having its amplitude and frequency adjusted, whereby it is possible to generate the swing power temporarily stored in the storage part 20A as vibration energy having its amplitude and frequency adjusted. Thus, the electric generator part 70 is able to convert the vibration energy efficiently to electric power, whereby it is possible to provide an electric generator device 5 which is excellent in power generation efficiency.

Further, the vibration energy generating part 40A has a pendulum 45A to be in contact with a rotary part 41A which is rotated by the power stored in the storage part 20A, thereby to adjust the rotational speed of the rotary part 41A, whereby the rotational speed of the rotary part 41A will be adjusted highly accurately, and the pendulum 45A can be highly accurately vibrated in a predetermined cycle. Thus, the vibration energy generating part 40A is capable of generating vibration energy having its amplitude and frequency highly accurately adjusted, and it is possible to provide an electric generator device 5 which is excellent power generation efficiency.

Further, it is possible to provide an electric generator device 5 for e.g. a wristwatch or the like movable by carrying it. Accordingly, for example, by utilizing vibration during walking of the user (environmental vibration) as the external vibration, it is possible to store the swing power of the swinging part 61A in the storage part 20A.

Further, the second electrode 72 is provided with an electret film 75, so that the electric charge of the first electrode 71 is increased or decreased by an increase or decrease of the overlapping area between the electret film 75 and the first electrode 71. Therefore, the electric generator device 5 can perform power generation by taking out the change in electric charge as an electric power.

(Quartz Wristwatch)

As an example of a portable electric apparatus comprising the electric generator device according to the present invention, a quartz wristwatch 1 (correspond to a "timepiece" in claims) will be described.

Figure 5:
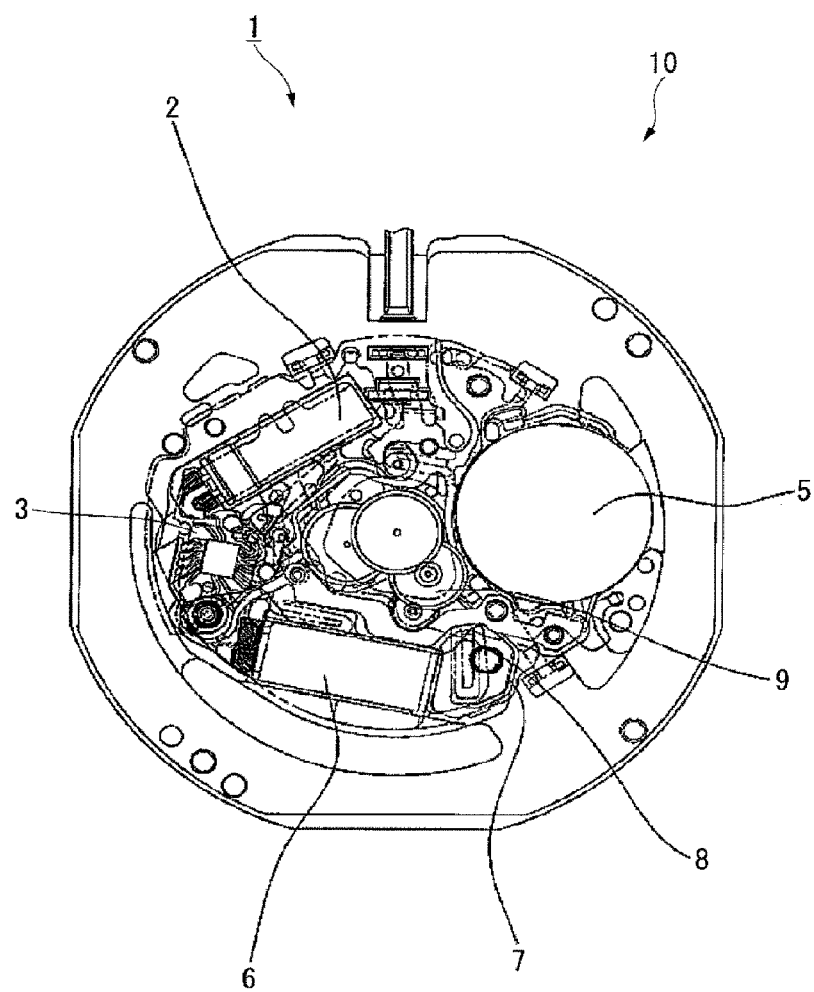
FIG. 5 is a structural diagram of a movement of a quartz wristwatch.

FIG. 5 is an internal structural diagram of a movement 10 of a quartz wristwatch 1 (corresponding to a "timepiece movement" in claims). FIG. 5 shows an electric generator device 5 schematically.

As shown in FIG. 5, the quartz wristwatch 1 comprises the electric generator device 5 according to the above-described embodiment, a quartz resonator 2, a circuit board 3, a coil 6, a stator 7, a rotor 8 and a gear 9. Among them, the circuit board 3 is provided with an oscillation circuit, a frequency divider circuit and a drive circuit.

When a person wearing the quartz wristwatch 1 is walking, walking vibration is input as external change (environmental vibration) to the electric generator device 5, whereby the electric generator device 5 generates an electric power. When a voltage is applied from the electric generator device 5 to the quartz resonator 2, the quartz resonator 2 will output an electrical signal of a predetermined frequency by the piezoelectric effect. When this electric signal is input to the circuit board 3, the oscillation circuit oscillates stably at a predetermined frequency. The frequency divider circuit counts the output signal of the oscillation circuit and outputs a pulse signal every predetermined time. Using the pulse signal as a trigger, the drive circuit inverts the drive current of the coil 6 alternately. By this drive current, the coil 6 generates a magnetic field, and the magnetic field is applied to the rotor 8 from both ends of the stator 7 to rotate the rotor 8 equipped with a permanent magnet. By the rotation of the rotor 8, the gear 9 is rotated, and the quartz wristwatch 1 is driven.

Here, according to this embodiment, it is possible to supply a timepiece movement 10 and a quartz wristwatch 1 equipped with the electric generator device 5. Especially, since the timepiece is a quartz wristwatch 1, it is possible to utilize vibration during the user's walking (environmental vibration) as external variation, to efficiently generate electric power.

The technical scope of the present invention is not limited to the above embodiment, and it is possible to make various modifications without departing from the scope of the present invention.

In the embodiment, the timepiece having the electric generator device 5 incorporated, is a so-called quartz wristwatch 1, but the application of the electric generator device 5 is not limited to the quartz wristwatch 1.

Further, in the embodiment, a case has been described wherein the electric generator device 5 is incorporated in a timepiece 1, but the electric generator device 5 may be present alone independently.

Further, patterning of the first electrode 71, the second electrode 72 and the electret film 75 may not be limited to the shape of the embodiment, but patterning may be in other shapes, so long as the overlapping area increases or decreases when the vibrators 51*a* and 51*b* are moved relative to the housing 12.

In the embodiment (see FIGS. 3 and 4), the first electrode 71 is provided on the housing 12, and the second electrode 72 and the electret film 75 are provided on the vibrator 51*a* or 51*b*. As another embodiment, the first electrode 71 and the electret film 75 may be provided on the housing 12, and the second electrode 72 may be provided on the vibrator 51*a* or 51*b*.

Further, in the embodiment, as a rectifier circuit 90 of the electric generator device 5, a bridge type rectifier circuit 93 is employed, but the rectifier circuit is not limited to the bridge-type rectifier circuit 93.

Figure 6:
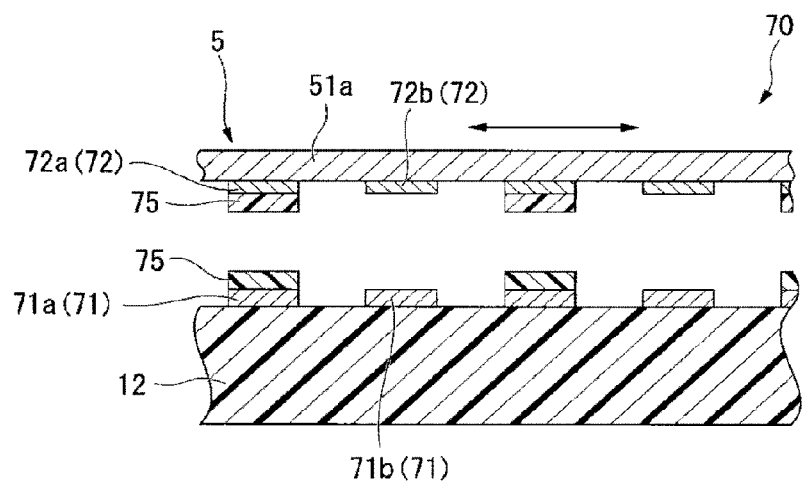
FIG. 6 is an explanatory diagram illustrating an electric generator part of an electric generator device according to another embodiment of the present invention.

FIG. 6 is a vertical sectional view of an electric generator part 70 according to another embodiment.

In the above embodiment, the electret film 75 is provided only on the second electrode 72, but it may be provided on at least one of the first electrode 71 and the second electrode 72. Accordingly, for example, as in another embodiment shown in FIG. 6, the electret film 75 may be provided on both electrodes of the first electrode 71 and the second electrode 72.

On the housing 12, for example, a first electrode 71*a* provided with an electret film 75, and a first electrode 71*b* not provided with an electret film 75 are alternately arranged. Further, on the vibrator 51*a*, for example, a second electrode 72*a* provided with an electret film 75, and a second electrode 72*b* not provided with an electret film 75 are alternately arranged, so as to face the first electrodes 71*a* and 71*b*. Thus, when the housing 12 and the vibrator 51*a* are relatively moved, the overlapping areas between the first electrode 71 side electret film 75 and the second electrode 72, and between the second electrode 72 side electret film 75 and the first electrode 71, can be increased or decreased. Therefore, even in a case where electret films 75 are provided on both electrodes of the first electrode 71 and the second electrode 72, the electric generator device 5 can generate electric power in the same manner as in the above embodiment.

Further, within a range not departing from the present invention, it is possible to optionally replace the constituting components in the above-described embodiments with well-known components.

INDUSTRIAL APPLICABILITY

The electric generator device of the present invention is widely useful for e.g. a timepiece, particularly for a movement for a quartz wristwatch.

This application is a continuation of PCT Application No. PCT/JP2014/070383, filed on Aug. 1, 2014, which is based upon and claims the benefit of priority from Japanese Patent Application No. 2013-175911 filed on Aug. 27, 2013. The contents of those applications are incorporated herein by reference in their entireties.

REFERENCE SYMBOLS

1: timepiece, 10: movement (movement for a timepiece), 12: housing, 20: barrel wheel (storage part), 20A: storage part, 40: escapement governor (vibration energy generating part), 40A: vibration energy generating part, 41: escape wheel (rotary part) 41A: rotary part, 45: anchor (pendulum), 45A: pendulum, 61: rotary weight (swinging part), 61A: swinging part, 70, 70A, 70B: electric generator part, 71: first electrode, 72: second electrode, 75: electret film (electric charge holding part)

What is claimed is:

1. An electric generator device, comprising:
   a swinging part which swings in position due to external swing;
   a storage part which stores swing power of the swinging part;
   a vibration energy generating part which generates, by the swing power stored in the storage part, vibration energy having an amplitude and a frequency adjusted; and
   an electric generator part which converts the vibration energy generated by the vibration energy generating part to electric power,
   wherein the vibration energy generating part comprises a pendulum which makes contact with a rotary part rotated by the swinging power stored at the storage part and adjusts a rotational speed of the rotary part.

2. The electric generator device according to claim 1, further comprising a housing which swingably secures the swinging part and supports the vibration energy generating part.

3. The electric generator device according to claim 1, wherein the electric generator part comprises a first electrode, a second electrode disposed to face the first electrode, and a charge holding part provided on at least one of the first electrode and the second electrode.

4. The electric generator device according to claim 3, wherein the charge holding part comprises a resin film of a fluorinated polymer, and an electric charge is injected to the resin film.

5. The electric generator device according to claim 4, wherein the fluorinated polymer has a relative dielectric constant in a range of from 1.8 to 8, a volume resistivity in a range of from $10^{10}$ Ωcm to $10^{20}$ Ωcm and a dielectric breakdown strength in a range of from 10 kV/mm to 25 kV/mm.

6. The electric generator device according to claim 4, wherein the fluorinated polymer is a ring-including fluorinated polymer comprising an aliphatic ring in a main chain thereof, or a derivative of the ring-including fluorinated polymer.

7. The electric generator device according to claim 6, wherein the ring-including fluorinated polymer comprises repeating units derived from a cyclic fluorinated monomer, or comprises repeating units formed by cyclopolymerization of a diene-based fluorinated monomer.

8. The electric generator device according to claim 6, wherein the derivative of the ring-including fluorinated polymer is a mixture of the ring-including fluorinated polymer and a component, which is a silane coupling agent or a polyvalent polar compound having a molecular weight of from 50 to 2,000 and comprising at least two polar functional groups, and which is other than the fluorinated polymer (a), or a reaction product of the ring-including fluorinated polymer and the component.

9. A timepiece movement comprising electric generator device as defined in claim 1.

10. A timepiece comprising the timepiece movement as defined in claim 9.

11. The electric generator device according to claim 1, wherein the storage part comprises a barrel wheel which comprises a spiral spring therein.

12. The electric generator device according to claim 11, wherein the storage part further comprises a ratchet disposed between the swinging part and the barrel wheel and transmits a rotation of the swinging part to the barrel wheel in only one direction.

13. The electric generator device according to claim 1, wherein the rotary part is an escape wheel comprising teeth on a periphery thereof.

14. The electric generator device according to claim 13, wherein the pendulum is a pair of anchor beams which is rotatably fixed around an anchor center, each comprises a nail stone at a tip thereof, and is urged by a balance spring in directions such that the pair of anchor beams alternately is engaged and disengaged with the teeth of the escape wheel and reciprocally rotated around the anchor center with a constant amplitude and frequency.

15. The electric generator device according to claim 1, wherein the storage part comprises:
a barrel wheel which comprises a spiral spring therein and stores the swinging power;
a ratchet which is disposed between the swinging part and the barrel wheel and transmits a rotation of the swinging part to the barrel wheel in only one direction; and
a transmission gear which is disposed between the barrel wheel and the vibration energy generating part and transmits the swinging power from the barrel wheel to the vibration energy generating part.

16. The electric generator device according to claim 1, wherein the vibration energy generation part comprises:
the rotary part which comprises an escape wheel comprising teeth on a periphery thereof and receives the swinging power from the storage part,
the pendulum comprising a pair of anchor beams which is rotatably fixed around an anchor center, each comprises a nail stone at a tip thereof and is urged by a balance spring in directions such that the pair of anchor beams alternately is engaged and disengaged with the teeth of the escape wheel and reciprocally rotate around the anchor center with a constant amplitude and frequency and that the vibration energy is generated; and
an arm which is connected to the pair of anchor beams, reciprocally rotates together with the pair of anchor beams and transmits the vibration energy to the electric generator part.

17. The electric generator device according to claim 1, wherein the electric generator part comprises: a vibrator which is connected to the vibration energy generating part and receives the vibration energy from the vibration energy generating part; a first electrode disposed on the vibrator, a second electrode disposed to face the first electrode; and a charge holding part provided on at least one of the first electrode and the second electrode, and the first electrode and the second electrode are relatively movable by the vibration energy such that the electric power is generated.

18. The electric generator device according to claim 15, wherein the vibration energy generation part comprises:
the rotary part which comprises an escape wheel comprising teeth on a periphery thereof and receives the swinging power from the storage part;
the pendulum comprising a pair of anchor beams rotatably which is fixed around an anchor center, each comprises a nail stone at a tip thereof and is urged by a balance spring in directions such that the pair of anchor beams alternately is engaged and disengaged with the teeth of the escape wheel and reciprocally rotate around the anchor center with a constant amplitude and frequency and that the vibration energy is generated; and
an arm which is connected to the pair of anchor beams, reciprocally rotates together with the pair of anchor beams and transmits the vibration energy to the electric generator part.

19. The electric generator device according to claim 15, wherein the electric generator part comprises: a vibrator which is connected to the vibration energy generating part and receives the vibration energy from the vibration energy generating part; a first electrode disposed on the vibrator; a second electrode disposed to face the first electrode; and a charge holding part provided on at least one of the first electrode and the second electrode, and the first electrode and the second electrode are relatively movable by the vibration energy such that the electric power is generated.

20. The electric generator device according to claim 18, wherein the electric generator part comprises: a vibrator which is connected to the vibration energy generating part and receives the vibration energy from the vibration energy generating part; a first electrode disposed on the vibrator; a second electrode disposed to face the first electrode; and a charge holding part provided on at least one of the first electrode and the second electrode, and the first electrode and the second electrode are relatively movable by the vibration energy such that the electric power is generated.

* * * * *